J. G. SMELTZER.
SAFETY APPLIANCE VALVE.
APPLICATION FILED JULY 10, 1917.
1,250,040.
Patented Dec. 11, 1917.
2 SHEETS—SHEET 2.
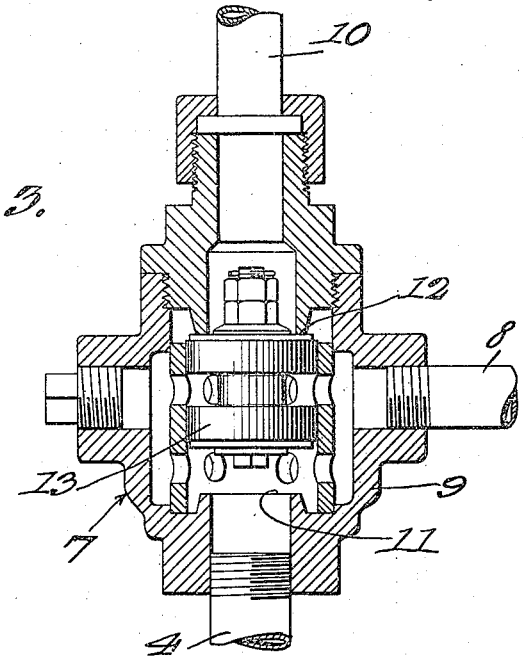
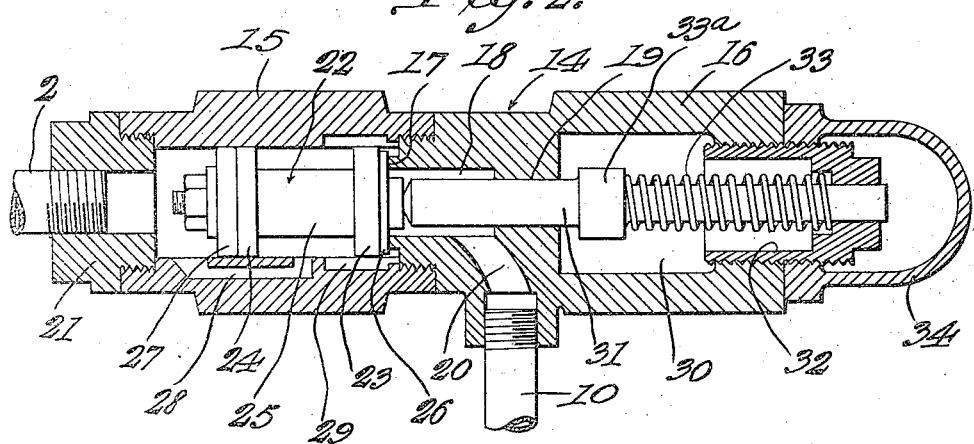
Witnesses
Inventor
J. G. Smeltzer
by
Attorneys

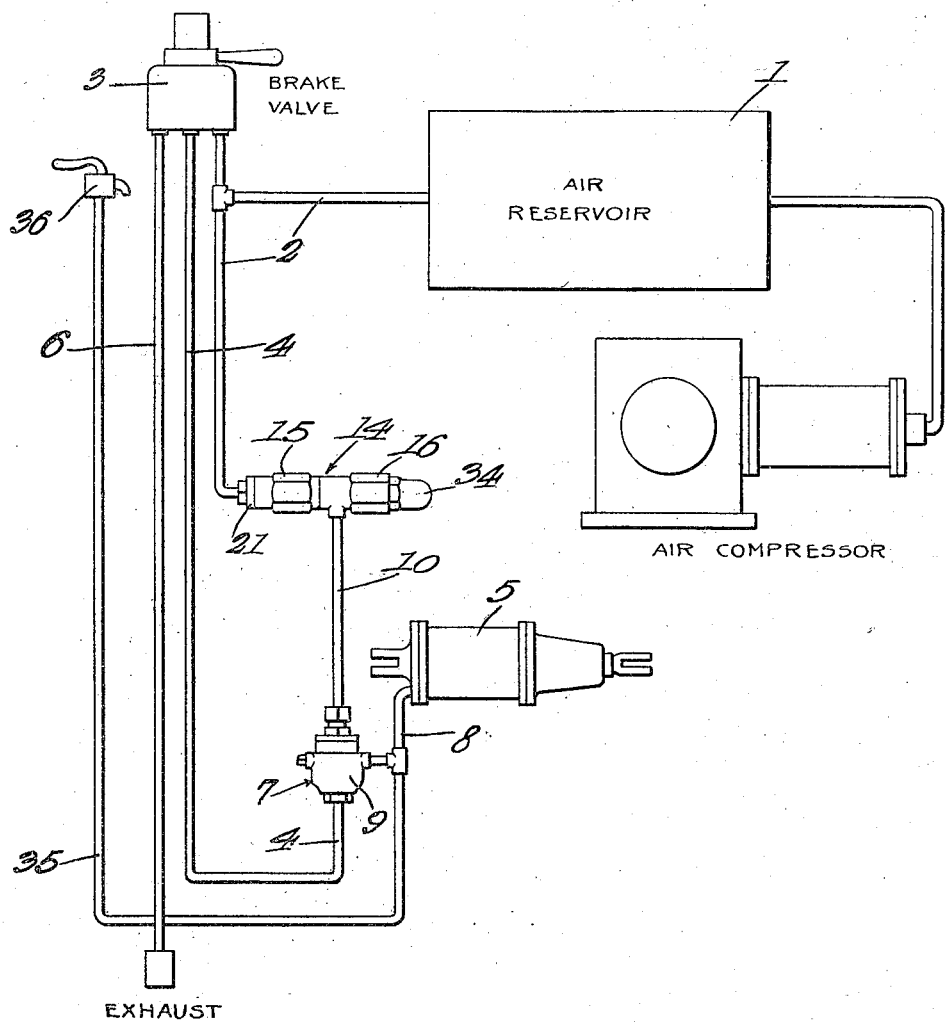

UNITED STATES PATENT OFFICE.

JAMES GARFIELD SMELTZER, OF GERMANTOWN, PENNSYLVANIA.

SAFETY-APPLIANCE VALVE.

1,250,040.  Specification of Letters Patent.  Patented Dec. 11, 1917.

Application filed July 10, 1917. Serial No. 179,700.

*To all whom it may concern:*

Be it known that I, JAMES G. SMELTZER, a citizen of the United States, residing at Germantown, in the county of Philadelphia and State of Pennsylvania, have invented a new and useful Safety-Appliance Valve, of which the following is a specification.

The present invention appertains generally to air brake equipments for street cars and other vehicles, and aims to provide novel and improved means for automatically applying the brakes should the reservoir or reservoir pipe pressure fall below a predetermined amount, thus preventing the motorman from proceeding with insufficient brake pressure, as would be dangerous, since the brakes could not be applied in case of emergency or even for ordinary stops.

It is the object of the invention to provide a comparatively simple and inexpensive device which can be readily installed in ordinary air brake equipment, to carry out the desired result in a thoroughly practical and reliable manner, the device being adjustable to operate at different reduced pressures.

The device is designed for connection between the air reservoir or reservoir pipe and the brake cylinder, in order that a predetermined reduction in pressure will automatically let the pressure flow to the brake cylinder, for applying the brakes.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:

Figure 1 is a diagrammatical view of the device as applied to an air brake equipment.

Fig. 2 is a longitudinal section of the device, portions being shown in elevation.

Fig. 3 is a sectional view of a double check valve used in connection with the device, portions being shown in elevation.

A simple air brake equipment is shown in Fig. 1, although it is to be understood that the device can be used in various equipments with equal propriety and success. The equipment illustrated embodies the air reservoir 1 supplied with pressure fluid from a compressor, and the pressure fluid flows from the reservoir 1 into the reservoir pipe 2 leading to the brake valve 3. A pipe 4 extends from the brake valve 3 to supply the air to the brake cylinder 5 which applies the brakes, and an exhaust pipe 6 also extends from the brake valve.

In using the present device, a double check valve 7 of common construction is employed, being connected between the pipe 4 and the pipe 8 of the brake cylinder 5. This valve 7 embodies a casing 9 to which the pipes 4 and 8 are connected, a pipe 10 being connected to the casing 9 opposite to the pipe 4. The casing has valve seats 11 and 12 adjacent to the pipes 4 and 10, respectively, and a double piston check valve 13 is slidable within the casing 9 to seat alternately against the seats 11 and 12. Under normal conditions, the valve 13 is forced against the seat 12 by the air pressure within the pipe 4, thus establishing communication between the pipes 4 and 8, and cutting off communication between the pipes 8 and 10. The air can therefore flow through the pipe 4 into and out of the brake cylinder for applying and releasing the brakes by the manipulation of the brake valve 3.

The present device, designated generally by the numeral 14, embodies a casing having the alining tubular sections 15 and 16 having their adjacent ends threadedly or otherwise detachably connected. That end of the section 16 which is attached to the section 15 has a valve seat 17, and the section 16 has a chamber 18 extending from said valve seat to a partition 19 within said section. The section 16 has a port 20 leading laterally from the chamber 18 and the pipe 10 is connected to the section 16 in communication with said port. An apertured plug 21 is threadedly connected to the other end of the section 15 of the casing for the connection of a branch of the reservoir pipe 2, so that reservoir pressure will prevail in the section 15.

A piston valve 22 is slidable within the casing section 15 and comprises a valve head 23 and a piston head 24 connected by a stem 25 of reduced diameter, said heads fitting snugly within the bore of the casing section 15. The head 23 has a washer or packing 26 to seat against the valve seat 17, and the piston head 24 has a packing cup 27 to bear against the walls of the casing section 15, to prevent leakage, and to assure of the seating of the valve by the air pressure against it from the pipe 2. This will prevent the flow of air from the reservoir pipe past the device into the pipe 10.

In order to let the air pass the valve 22 when the valve is unseated, the wall of the casing section 15 has a by-pass 28 leading from one side of the piston head 24 to the other to let the air flow past said piston head from the pipe 2, and the casing section 15 is provided adjacent to the valve seat with inner recesses 29 extending across the periphery of the valve head 23, to let the air flow past said valve head from the by-pass 28 which admits the air to the space between the heads 23 and 24. Thus, when the valve 22 is unseated, the air can flow from the pipe 2 into the casing section 15 between the piston head 24 and the plug 21, thence through the by-pass 28 into the chamber between the heads 23 and 24, and thence through the recesses 29 past the valve seat 17 into the chamber 18. This admits the air into the pipe 10.

Adjustable spring means is provided for unseating the valve 22 when the pressure is reduced a predetermined amount. Thus, the casing section 16 has a chamber 30 extending from the partition 19 to that end of the section 16 opposite to the section 15, and a plunger 31 is slidable through the partition and extends within the chamber 18 to a point adjacent to the valve 22. A cup-shaped plug 32 is threaded within the chamber 30 of the casing section 16, and the outer terminal of the plunger or stem 31 extends slidably through the closed end of the plug 32. A coiled wire expansion spring 33 surrounds the plunger and is confined between the closed end of the plug 32 and a collar 33$^a$ with which the plunger is provided, said collar being seatable against the partition 19 to limit the movement of the plunger by the spring. A cap 34 is threaded over the plug 32 to inclose said plug and plunger, and to serve as a lock nut to bear against the casing section 16 for holding the plug or adjusting screw 32 in its adjusted position. It is evident that by removing the cap or lock nut 34, the plug or screw 32 can be adjusted to regulate the tension of the spring 33, according to the pressure at which it is desired to open the valve 22.

A relief pipe 35 is connected to the pipe 8 or directly to the cylinder 5 and leads to a point near the brake valve 3, the relief pipe 35 having a controlling valve 36, which is normally closed, to prevent the escape of air.

In operation, when normal pressure within the air reservoir pipe 2 exists, the pressure against the valve 22 will hold it seated, so that the air cannot flow into the pipe 10 from the pipe 2. By operating the brake valve 3, the brakes can be readily applied and released, the double check valve 13 being held by pressure against the seat 12. Now, should the air within the reservoir and reservoir pipe be reduced to a predetermined pressure, at which it would be dangerous to operate the car, the pressure against the valve 22 being reduced, it will be overcome by the tension of the spring 33 which forces the plunger 31 against the valve 22, tending to unseat said valve continually. The unseating of the valve 22 is normally prevented, however, by the preponderating pressure of the air against the valve 22, but when the air pressure is reduced, the spring 33 asserts itself and by moving the plunger 31 toward the valve 22, forces said valve open, the movement of the valve being limited when the collar 33$^a$ strikes the partition 19. The air can then flow from the reservoir pipe 2 to the pipe 10, and since the pipe 4 is normally connected to the exhaust pipe 6 when the brakes are released, the air pressure flowing from the pipe 10 into the casing 9, will force the valve 13 away from the seat 12 and against the seat 11, thus shutting off the connection between the pipes 8 and 4, and establishing the connection between the pipes 10 and 8. The pressure fluid from the pipe 10 will therefore flow through the pipe 8 into the brake cylinder 5, and apply the brakes automatically. To restore normal conditions, the valve 36 is opened, letting the air escape from the brake cylinder, to release the brakes, after which the valve 36 is again closed. If the valve 22 does not seat of itself by the accumulation of air pressure in the reservoir and reservoir pipe, then by removing the cap 34, the plunger can either be retracted or the plug 32 loosened, so that the valve 22 will be seated, the plunger, plug 32 and cap 34 then being restored.

Supposing that the car has been stopped, due to insufficient air pressure, it is impossible to release the brakes unless the air is pumped up above a predetermined pressure. Thus, as soon as the pump is started, if the pressure in the reservoir is at zero or comparatively low, the air will be free to pass to the brake cylinder, but by bringing the pressure up to a point greater than the pressure of the spring 33, the safety valve can be restored, by quickly opening the bleed cock or valve 36, thus letting the air escape from the brake cylinder, and the sudden flow of air thus started through the safety valve, will close the same. The valve 36 is left open until the air from the brake cylinder has escaped, in which event the valve 36 is closed. The brakes are thus released, and the car is ready to proceed with sufficient air pressure in the reservoir.

Having thus described the invention, what is claimed as new is:

1. A brake equipment including in combination, a source of pressure fluid, a brake cylinder, a double check valve connected to the brake cylinder, a brake valve connected to said source of supply and double check valve, and an automatic valve connected to said double check valve and source of supply, the double check valve having means for alternately shutting off communication between the brake cylinder and the brake valve and automatic valve by pressure fluid flowing from said automatic valve and brake valve, respectively, and the automatic valve having means for normally preventing the flow of pressure fluid from the source of supply past the automatic valve unless the pressure is reduced a predetermined amount.

2. A brake equipment including in combination, a source of pressure fluid, a brake cylinder, a double check valve connected to the brake cylinder, a brake valve connected to said source of supply and double check valve, and an automatic valve connected to said double check valve and source of supply, the double check valve having means for alternately shutting off communication between the brake cylinder and the brake valve and automatic valve pressure fluid flowing from said automatic valve and brake valve, respectively, and the automatic valve having means for normally preventing the flow of pressure fluid from the source of supply past the automatic valve unless the pressure is reduced a predetermined amount, and independent means for relieving the pressure fluid from the brake cylinder.

3. A device of the character described embodying a valve casing comprising detachably connected sections, one of them having a valve seat at its adjacent portion, a piston valve slidable within one casing section and seatable against said seat by reservoir pressure, one casing section having a port to communicate with a brake cylinder and toward which said valve is seatable, and a spring-pressed plunger slidable within one casing section to bear against the valve and tending to unseat it, the valve being within one casing section and the plunger within the other.

4. A device of the character described embodying a casing having detachably connected sections, one having a valve seat at the adjacent portions of said sections, a piston valve slidable within the other casing section to seat against said seat, the second mentioned section having means for the connection of a reservoir pipe, the first mentioned section having a port to communicate with a brake cylinder, and a spring-pressed plunger mounted within the first mentioned section to bear against said valve and tend to unseat it.

5. A device of the character described, embodying a casing having alining sections, their adjacent ends being detachably connected, one of the adjacent section ends having a valve seat, a piston valve slidable within the other casing section and seatable against said seat, the second mentioned section having means for the connection of a reservoir pipe, the first mentioned section having a partition and a port between said partition and valve seat to communicate with a brake cylinder, an adjustable member within the first mentioned casing section, a plunger slidable within said partition and adjustable member to bear against said valve, and an expansion spring between said adjustable member and plunger tending to unseat the valve.

6. A device of the character described, embodying a casing having alining sections, their adjacent ends being detachably connected, one of the adjacent section ends having a valve seat, a piston valve slidable within the other casing section and seatable against said seat, the second mentioned section having means for the connection of a reservoir pipe, the first mentioned section having a partition and a port between said partition and valve seat to communicate with a brake cylinder, an adjustable member within the first mentioned casing section, a plunger slidable within said partition and adjustable member to bear against said valve, an expansion spring between said adjustable member and plunger tending to unseat the valve, the plunger having a collar against which said spring bears and to contact with said partition to limit the movement of the plunger, and a cap threaded on said adjustable member to hold it in place and inclose said adjustable member and plunger.

7. A brake equipment including in combination, a source of pressure fluid, a brake cylinder, a brake valve connected to the source of supply, an automatic valve connected to the source of supply, means for alternately establishing communication automatically between said valves and brake cylinder, the automatic valve being arranged to open automatically when the pressure is reduced below a predetermined amount and to close by a sudden flow of pressure fluid to the brake cylinder, above a predetermined pressure, and a bleed valve connected to the brake cylinder for discharging the pressure fluid therefrom.

In testimony that I claim the foregoing as my own, I have hereto affixed my signature in the presence of two witnesses.

JAMES GARFIELD SMELTZER.

Witnesses:
GEO. F. McNICHOL,
WM. H. JONES.